US011156090B2

(12) United States Patent
Roberge

(10) Patent No.: US 11,156,090 B2
(45) Date of Patent: Oct. 26, 2021

(54) LOW SPEED FAN FOR GAS TURBINE ENGINES

(71) Applicant: UNITED TECHNOLOGIES CORPORATION, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 598 days.

(21) Appl. No.: 14/761,348

(22) PCT Filed: Dec. 19, 2013

(86) PCT No.: PCT/US2013/076550
§ 371 (c)(1),
(2) Date: Jul. 16, 2015

(87) PCT Pub. No.: WO2014/143305
PCT Pub. Date: Sep. 18, 2014

(65) Prior Publication Data
US 2015/0369046 A1 Dec. 24, 2015

Related U.S. Application Data

(60) Provisional application No. 61/782,603, filed on Mar. 14, 2013.

(51) Int. Cl.
*F01D 5/02* (2006.01)
*F01D 5/28* (2006.01)
(Continued)

(52) U.S. Cl.
CPC .............. *F01D 5/02* (2013.01); *F01D 5/147* (2013.01); *F01D 5/225* (2013.01); *F01D 5/282* (2013.01);
(Continued)

(58) Field of Classification Search
CPC . F01D 5/34; F01D 5/30; F01D 5/3023; F01D 5/3061; F01D 5/3015;
(Continued)

(56) References Cited

U.S. PATENT DOCUMENTS 3,616,508 A * 11/1971 Wallett .................... F01D 5/282
29/889.21
3,747,343 A * 7/1973 Rosen ....................... F02K 3/06
415/119

(Continued)

FOREIGN PATENT DOCUMENTS

EP 0496550 A1 7/1992
EP 0900920 A2 3/1999
(Continued)

OTHER PUBLICATIONS

Rauch, D., "Design Study of an Air Pump and Integral Lift Engine ALF-504 Using the Lycoming 502 Core", NASA Report CR-120992, NASA Lewis Research Center, Cleveland, Ohio, 1972.*
(Continued)

*Primary Examiner* — Christopher Verdier
(74) *Attorney, Agent, or Firm* — Cantor Colburn LLP

(57) ABSTRACT

A fan section for a gas turbine engine is disclosed herein. The fan may include a rotor disk and a plurality of airfoils fixedly attached to and supported by the rotor disk as a single unitary piece. The airfoils may extend radially outward from the rotor disk with respect to an engine axis. The rotor disk may be made of metal and the airfoils may each be made at least partially of an organic matrix composite.

18 Claims, 9 Drawing Sheets

(51) Int. Cl.

| | |
|---|---|
| *F01D 5/34* | (2006.01) |
| *F01D 5/22* | (2006.01) |
| *F04D 29/02* | (2006.01) |
| *F04D 29/32* | (2006.01) |
| *F02K 3/06* | (2006.01) |
| *F01D 5/30* | (2006.01) |
| *F04D 29/34* | (2006.01) |
| *F01D 5/14* | (2006.01) |
| *F02C 3/04* | (2006.01) |

(52) U.S. Cl.
CPC ......... *F01D 5/3061* (2013.01); *F01D 5/3069* (2013.01); *F01D 5/34* (2013.01); *F02C 3/04* (2013.01); *F02K 3/06* (2013.01); *F04D 29/023* (2013.01); *F04D 29/321* (2013.01); *F04D 29/324* (2013.01); *F04D 29/325* (2013.01); *F04D 29/34* (2013.01); *F05D 2220/32* (2013.01); *F05D 2220/36* (2013.01); *F05D 2230/23* (2013.01); *F05D 2230/232* (2013.01); *F05D 2230/234* (2013.01); *F05D 2230/60* (2013.01); *F05D 2300/121* (2013.01); *F05D 2300/133* (2013.01); *F05D 2300/43* (2013.01); *F05D 2300/603* (2013.01); *Y02T 50/60* (2013.01); *Y10T 29/49323* (2015.01)

(58) Field of Classification Search
CPC .......... F01D 5/3069; F01D 5/02; F01D 5/147; F01D 5/282; F04D 29/322; F04D 29/325; F04D 29/34; F05D 2220/36; F05D 2230/23; F05D 2230/232; F05D 2230/234; F05D 2220/32; F05D 2230/60; F02C 3/04
USPC .................................. 416/213 R, 213 A, 234
See application file for complete search history.

(56) References Cited

U.S. PATENT DOCUMENTS

| | | | |
|---|---|---|---|
| 5,562,419 A | 10/1996 | Crall | |
| 5,660,526 A | 8/1997 | Ress, Jr. | |
| 6,431,835 B1* | 8/2002 | Kolodziej | F01D 5/28 416/219 R |
| 7,334,997 B2 | 2/2008 | Karafillis | |
| 7,775,772 B2* | 8/2010 | Carrier | B23K 20/129 416/213 R |
| 2002/0044870 A1 | 4/2002 | Simonetti et al. | |
| 2006/0140772 A1* | 6/2006 | McMillan | F01D 5/147 416/241 R |
| 2007/0065291 A1* | 3/2007 | Karatillis | F01D 5/16 416/224 |
| 2008/0134504 A1 | 6/2008 | Schoenenborn | |
| 2011/0268578 A1* | 11/2011 | Praisner | F01D 5/141 416/241 R |
| 2012/0156044 A1* | 6/2012 | Ortiz | F01D 5/34 416/213 R |

FOREIGN PATENT DOCUMENTS

| | | |
|---|---|---|
| EP | 1396608 A2 | 3/2004 |
| EP | 2014869 A1 | 1/2009 |
| EP | 2339117 A2 | 6/2011 |
| JP | 2009-019630 A | 1/2009 |

OTHER PUBLICATIONS

Hall, Cesare A., "Engine Design Studies for a Silent Aircraft", Journal of Turbomachinery, Jul. 2007, vol. 129, pp. 479-487.*
European Search Report for Application No. EP 13 87 8165.
International Search Report Application No. PCT/US2013/076550; dated Apr. 9, 2014.

* cited by examiner

LOW SPEED FAN FOR GAS TURBINE ENGINES

CROSS-REFERENCE TO RELATED APPLICATION

This Application is a US National Stage under 35 USC § 371 of International Patent Application No. PCT/US13/76550 filed on Dec. 19, 2013 based on U.S. Provisional Patent Application Ser. No. 61/782,603 filed on Mar. 14, 2013.

FIELD OF THE DISCLOSURE

The present disclosure generally relates to gas turbine engines and, more specifically, to fans for gas turbine engines.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan and compressor section rotate to draw in and compress the ambient air. In many engines, a large portion of the air passing the fan does not flow to the compressor section, but instead bypasses the core of the engine. This bypass flow can generate a significant portion of the total thrust of the engine. On the other hand, the air flowing into the compressor section, the core flow, is compressed and then flows into the combustor section. A portion of the core air flow is used for cooling purposes, while the rest is mixed with a fuel and combusted.

The products of the combustion then travel out of the combustor as exhaust and through a turbine section. The turbine section is forced to rotate as the exhaust expands through the turbine section. The turbine section, fan, and compressor section are connected by an engine shaft running through the center of the engine. In a multi-spool engine there are a plurality of concentrically mounted engine shafts connecting the compressor and turbine sections. Thus, as the turbine section rotates and extracts work from the exhaust, the fan and corresponding compressor section rotate to bring in and compress new air.

As engine technology progresses, particularly with the advent of geared turbofan engines, larger fans are being developed to increase the ratio between the bypass flow and the core flow. However, as these fans increase in size, the weight of the fan is also increasing. When used in conjunction with aircraft, increasing the weight of the engine decreases the overall efficiency of the air vehicle system as more of the thrust is used to offset the induced drag from additional engine weight, and less is available for the aircraft to use in transporting passengers or cargo.

Prior art fans attempt to reduce the weight of the fan by many different means. These include hollow mechanically attached airfoils and integrally bladed rotors (IBRs) also referred to as bladed disks or "blisks" which have unitary metal blades radially extending from a metal disk, such as in U.S. Pat. No. 7,334,997 B2. Each concept has limitations relative to the ability to deliver reduced weight as bypass ratio increases in the pursuit of improved propulsive efficiency and reduced noise for subsonic aircraft. Therefore, a need exists for large diameter fans for gas turbine engines which have a reduced weight compared with the prior art fans in order to function in typical aerospace applications.

SUMMARY OF THE DISCLOSURE

In accordance with one aspect of the disclosure, a fan section for a gas turbine engine is disclosed. The fan may include a rotor disk made of metal and a plurality of airfoils fixedly attached to and supported by the rotor disk as a single unitary piece. The airfoils may extend radially outward from the rotor disk with respect to an engine axis. The airfoils may each be made at least partially of an organic matrix composite.

In a refinement, the fan section may further include a plurality of collars, each collar being bonded to the rotor disk and fixedly attaching one of the plurality of airfoils to the rotor disk. In another refinement, each collar may be made of one of aluminum and titanium.

In another refinement, the fan section may further a plurality of shear lugs, each shear lug extending through one of the collars and one of the airfoils.

In further refinement, the airfoil includes a body and an edge extending radially along the body, the body may be formed from the organic matrix composite and the edge may be formed from a metallic material.

In yet another refinement, the airfoils include a body and an edge extending radially along the body. The body may be formed from a first metallic material and the edge may be formed from a second metallic material.

In a further refinement, the airfoils may further include a side panel, where the side panel may be formed from an organic matrix composite.

In yet another refinement, the fan section may further include a partial-span shroud connecting adjacent airfoils. The partial-span shroud may extend from a point on each airfoil located between a base and a tip of the airfoil to a similar point on adjacent airfoils.

In a further refinement, the partial-span shroud may be one of cast, fixedly attached, and fabricated as one unitary piece with the airfoils.

In still another refinement, the fan may further include a tip shroud connecting adjacent airfoils at a tip of each airfoil.

In a further refinement, the tip shroud may be one of cast, fixedly attached, and fabricated as one unitary piece with the airfoils.

In another further refinement, the fan may further include an outer-span blade fixedly attached to at least one of the tip of the airfoil and the tip shroud, wherein the outer-span blade is one of cast, fixedly attached, and fabricated as one unitary piece with the airfoils.

In yet a further refinement, the fan section rotates at a maximum speed of about 1050 feet per second or less.

In accordance with another aspect of the present disclosure, a gas turbine engine is disclosed. The engine may include a fan section having a rotor disk made of metal and a plurality of radially outwardly extending airfoils with respect to an engine axis. The airfoils may be fixedly attached to and supported by the rotor disk. The airfoils may be made at least partially of an organic matrix composite. The engine may further include a compressor section downstream from the fan section, a combustor downstream from the compressor section, and a turbine section downstream from the combustor. The turbine section may be in mechanical communication with the fan section and compressor section via an engine shaft.

In another refinement, the engine may further include a plurality of collars each being bonded to the rotor disk and fixedly attaching one of the plurality of airfoils to the rotor disk. Each collar may be made of one of aluminum and titanium. In another refinement, the airfoils may include a body, an edge extending radially along the body, and a side panel, with each being manufactured of one of a metal or organic matrix composite.

In accordance with yet another aspect of the present disclosure, a method of forming a fan section of a gas turbine engine is disclosed. The method may include providing a rotor disk made of metal and fixedly attaching a plurality of airfoils made at least partially of composite matrix composite to the rotor disk.

In another refinement, the method may further include fixedly attaching a partial-span shroud to adjacent airfoils.

In another refinement, the method may further include fixedly attaching a tip shroud between adjacent airfoils.

In a further refinement, the method may further include fixedly attaching an outer-span blade to at least one of the rotor airfoil and the tip shroud.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
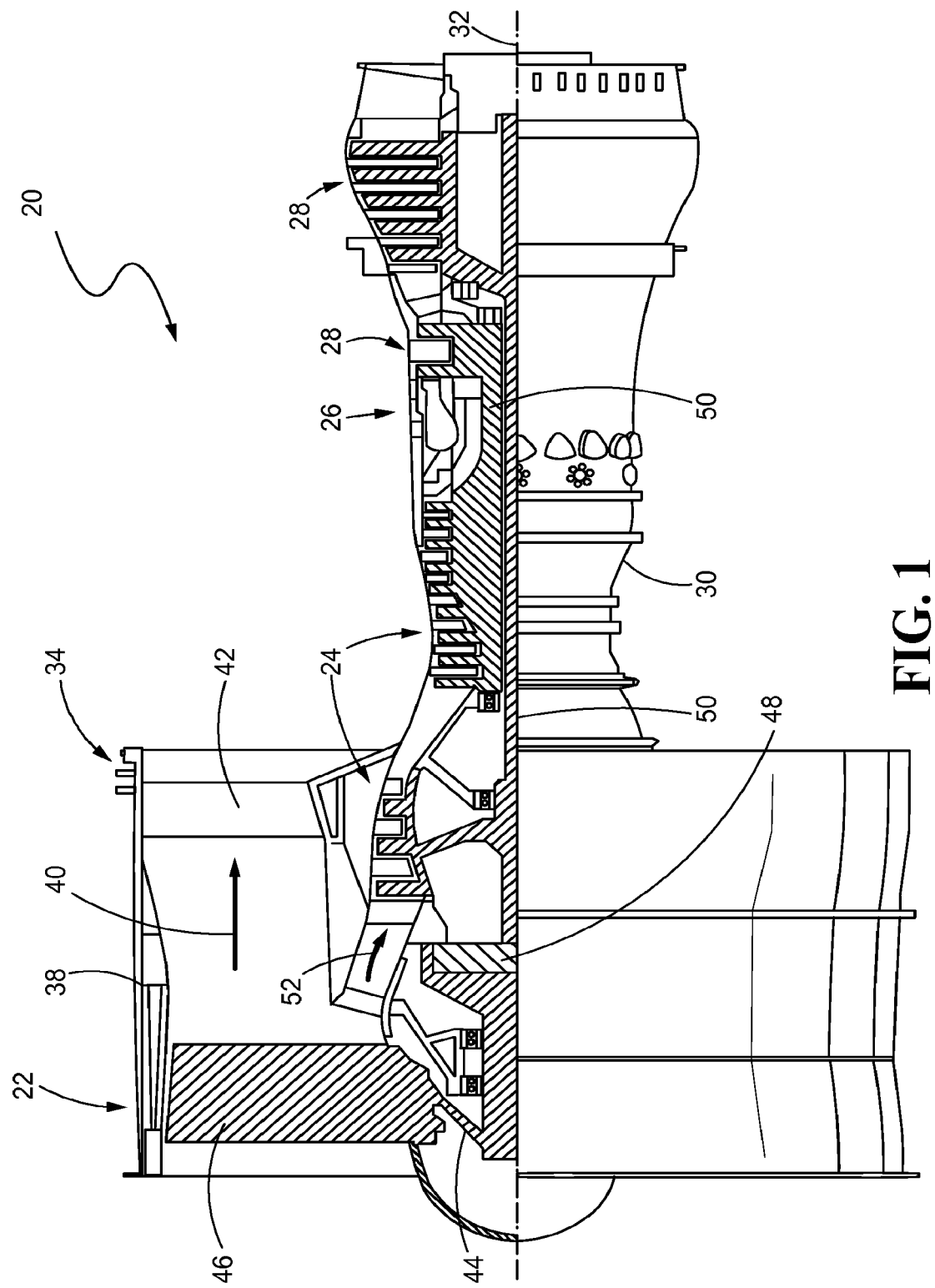
FIG. 1 is a cross-sectional view of a geared turbofan constructed in accordance with an embodiment of the present disclosure.

Referring now to the drawings and with specific reference to FIG. 1, a gas turbine engine 20 is depicted as a geared turbofan engine. However, other engine types are possible and FIG. 1 is simply one embodiment illustrated here for description purposes. The engine 20 includes a plurality of components, including a fan section 22, a compressor section 24, a combustor 26, a turbine section 28, and an engine case 30, aligned axially along an engine axis 32. The fan section 22 includes a fan case 38 radially outward from the engine case 30 with respect to the engine axis 32 and defining a bypass air flow path 40 therebetween. The fan section 22 further includes a plurality of fan exit guide vanes 42 extending between the engine case 30 and fan case 38. The fan section 22 further includes a rotor disk 44 and a plurality of fan blades 46 radially extending outward from the rotor disk 44. In the illustrated engine 20, known as a geared turbofan engine, the rotor disk 44 of the fan section 22 is mechanically connected to a gearbox 48, which transfers rotational motion with a difference in rotor speed from the turbine section 28 via an engine shaft 50 extending through the engine 20 along the engine axis 32.

By rotating about the axis 32, the fan blades 46 draw in and accelerate ambient air. In the illustrated engine 20, a majority of the air accelerated by the fan blades 46 travels along the bypass air flow path 40 to generate the primary source of thrust of the engine 20. Some of the air accelerated by the fan 22 also enters the engine 20 through a core air flow path 52 where the air is compressed, combusted, and then expanded. The air from the core air flow path 52 generates thrust, but also rotates the turbine section 28, which may generate electricity and rotates the fan blades 46 and rotors in the compressor section 24 via the engine shaft 50. FIG. 1 depicts the engine 20 as a dual-spool geared turbofan engine having an annular combustor; however, this is simply for illustration purposes and any gas turbine engine is possible such as a three spool engine, for example.

One method of increasing the thrust of the engine 20 is to increase a ratio, known as the bypass ratio, between the bypass air flow path 40 and the core air flow path 52, which requires a larger fan section 22. Such larger fan sections 22 increase the weight of the engine 20. However, as weight is preferably to be kept to a minimum onboard aircraft, in order to reduce the weight of the fan section 22, the fan section 22 of the present disclosure provides design options to reduce the weight of the fan section 22. The fan section 22 of a geared turbofan engine rotates at slower speeds than prior art fans, for example, at around a maximum rotational speed of about 1050 feet per second or slower at a tip 58 of the airfoil 46, whereas prior art fans typically rotate at about 1300 feet per second or more at the tip 58 of the airfoil 46. The tip 58 of the airfoil is the most radially distant extent of the airfoil 46 from the rotor disk 44 with respect to the engine axis 32. Such lower rotational speeds reduce the damaging effects of bird and debris impacts on the fan section 22. However, to accommodate such larger diameter fans, the present disclosure sets forth a number of fan blade design features to reduce weight while still being structurally sound.

Figure 2:
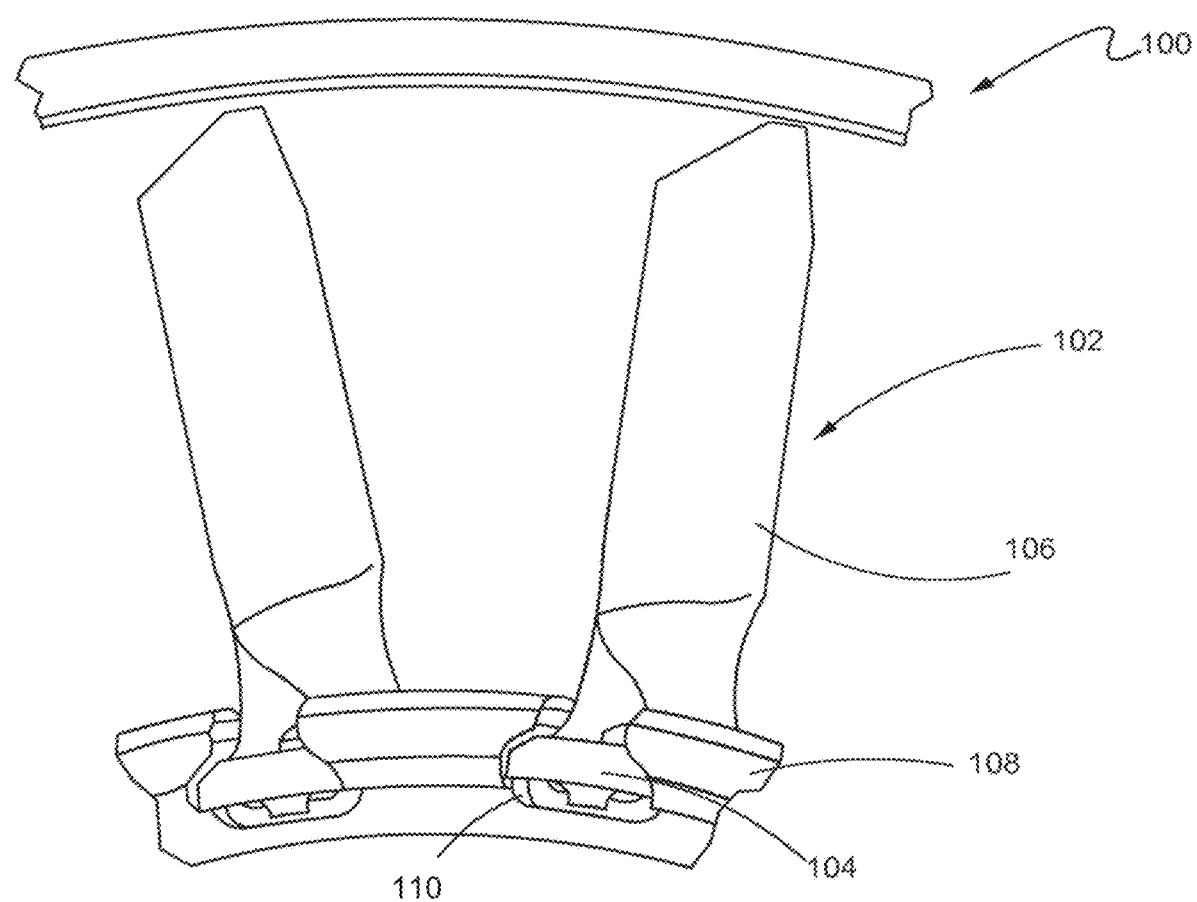
FIG. 2 is a perspective view of a rotor section of a prior art fan.

As can be seen in FIG. 2, prior art fans 100 may include a rotor airfoil 102 and a rotor disk 108. The rotor airfoil 102 may have a root 104 and a blade 106 extending away from the root 104. The rotor disk 108 may define an anchoring attachment cavity 110 that is configured to receive the root 104 of the airfoil 102 to retain the airfoil 102 during operation. While effective, such a root and anchoring attachment cavity construction necessarily adds weight to the fan.

Figure 3:
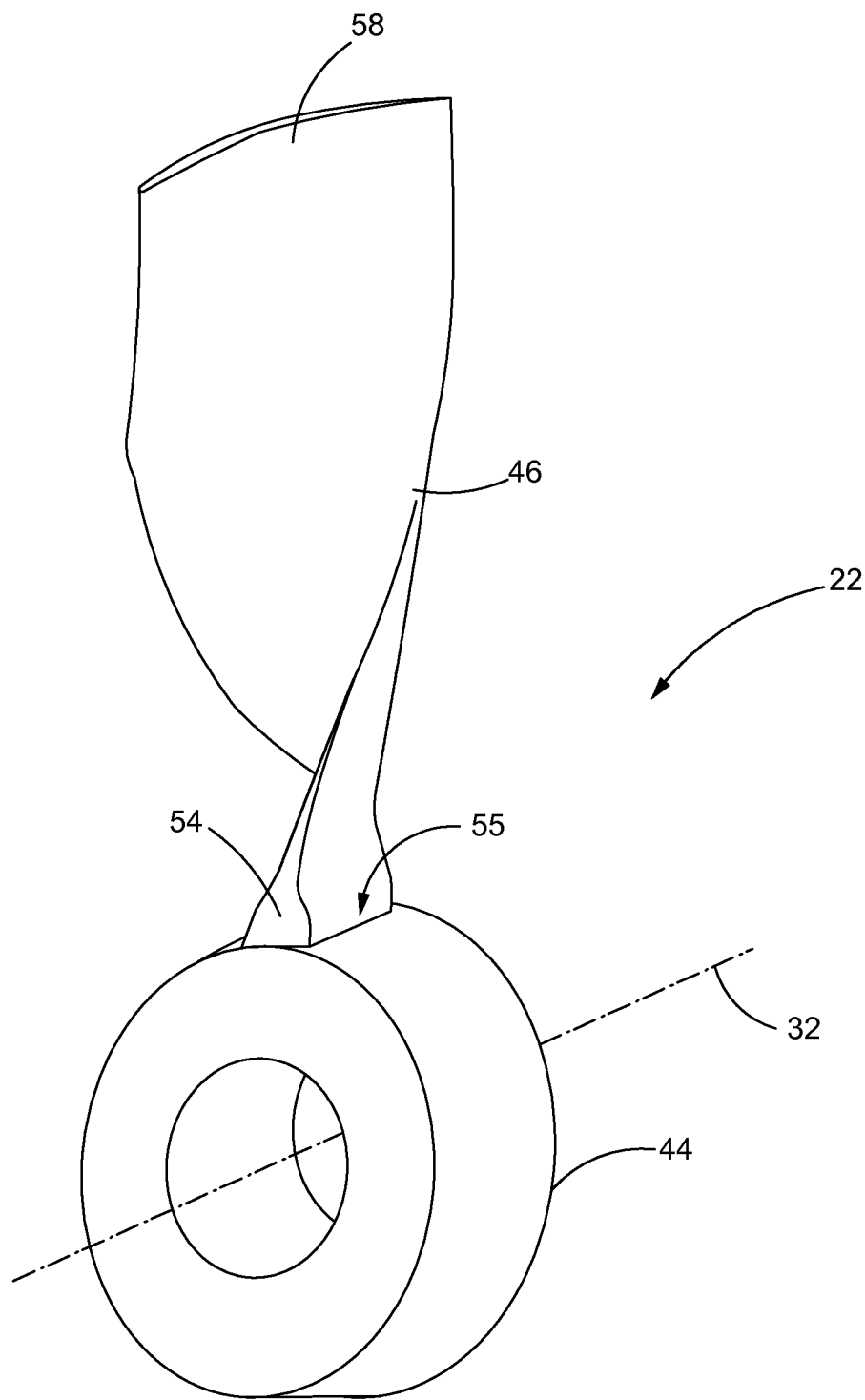
FIG. 3 is a perspective view of a rotor section of a fan constructed in accordance with an embodiment of the present disclosure.

In the fan section 22 of the present disclosure, depicted in FIG. 1 on the other hand, the rotor airfoils 46 are unitary with the rotor disk 44 and do not have a root, and thus the rotor disk 44 does not require an anchoring attachment cavity. The rotor airfoils 46 may be bonded or otherwise fixedly attached to the rotor disk 44 by any number of methods including, but not limited to, welding, transient liquid phase bonding or direct laser or other additive manufacturing enabled deposition. A base 54 of the airfoil 46 may be welded directly to the rotor disk 44 at a bonding interface 55, as shown in FIG. 3. Alternatively, the airfoils 46 may be cast as one unitary piece with the rotor disk 44 or machined from single section of parent material. The parent material may include one or more alloys or differential alloy heat treats to optimize material properties in selected regions of the fan section 22.

As used herein, the term "fixedly attached" is to be understood to include any method of permanently attaching or joining two or more elements together for use during the combined objects intended operation such as, but not limited to, welding, transient liquid phase bonding, direct laser deposition, or the like.

Figure 4:
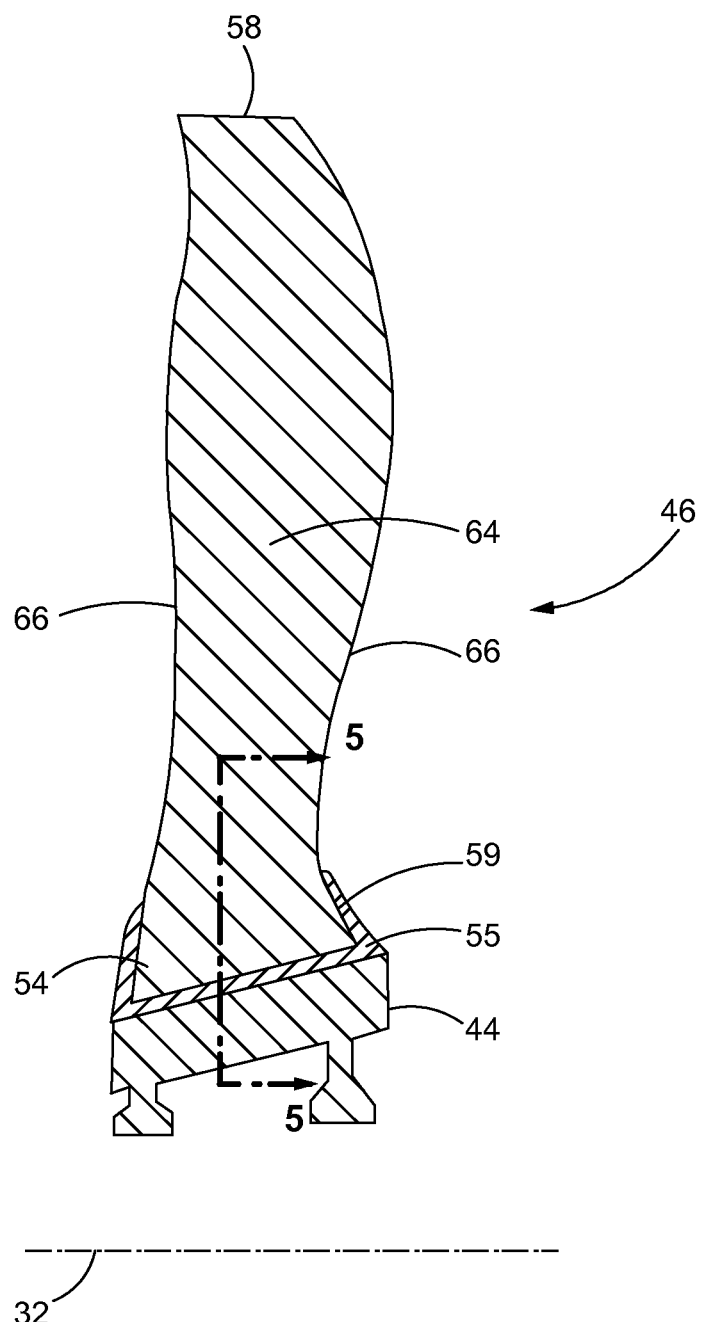
FIG. 4 is a cross-sectional view of a fan constructed in accordance with an embodiment of the present disclosure.
Figure 5:
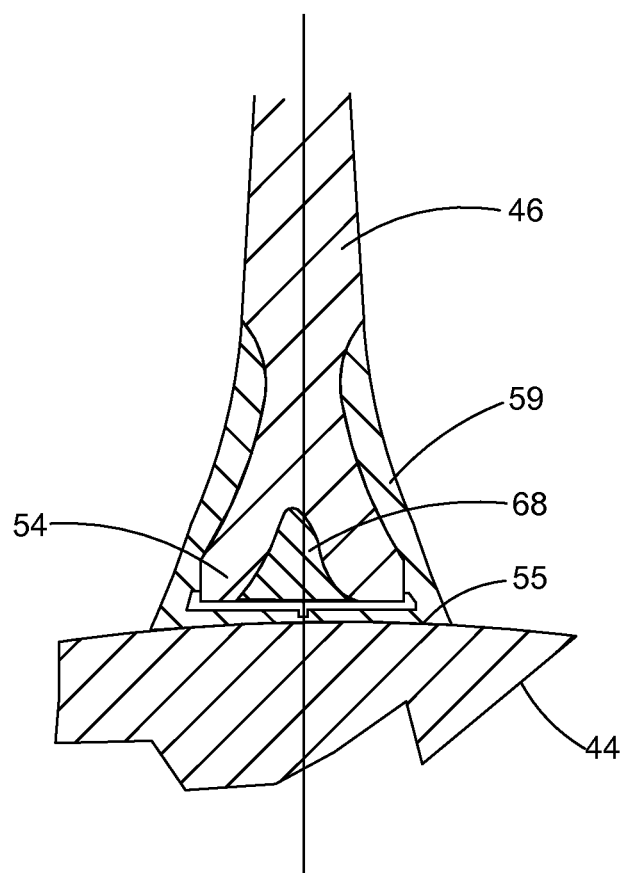
FIG. 5 is a cross-sectional view of a fan taken along the line 5-5 in FIG. 4.
Figure 6:
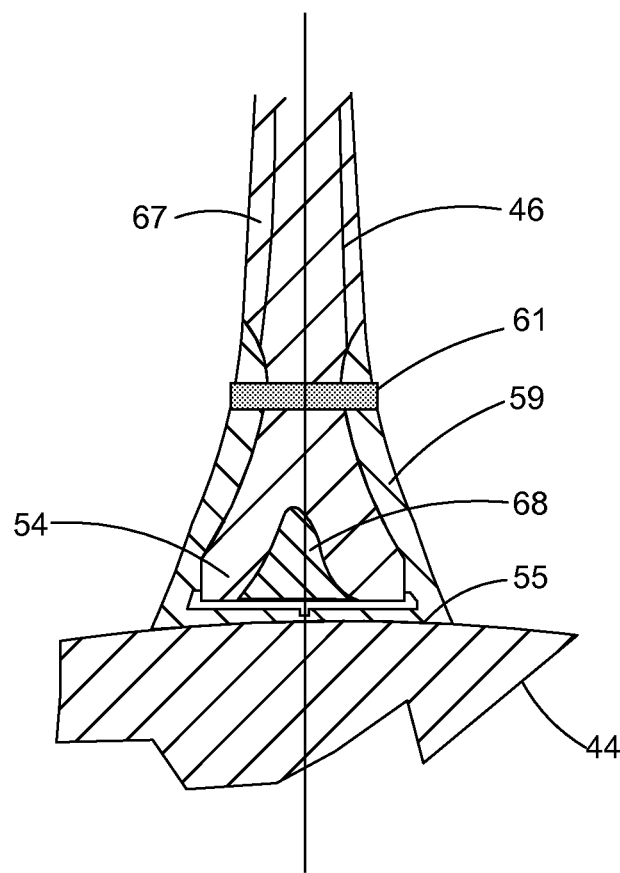
FIG. 6 is a cross-sectional view of an alternate embodiment of a fan taken along the line 5-5 of FIG. 4.

As can be seen from FIGS. 4-6, a collar 59 may act as an intermediary to fixedly attach the airfoil 46 to the disk 44. The collar 59 may be positioned around the base 54 of the airfoil 46 and bonded to the disk 44 at the bonding interface 55. This method of joining the airfoil 46 with the disk 44 may be used in situations where welding, transient liquid phase bonding, or direct laser or other additive manufacturing enabled deposition is not possible to provide weight efficient hybrid structures. For example, the airfoil 46 may be constructed, at least partially, from an organic matrix composite while the disk 44 may be constructed of aluminum or titanium. One of ordinary skill in the art will understand the materials encompassed by "organic matrix composite", and as used herein refers to materials made from two or more constituent materials with significantly different physical or chemical properties, that when combined, produce a material with characteristics different from the individual components. Examples of organic matrix composites include, but are not limited to fiber reinforced polymers. The individual components remain separate and distinct within the finished structure.

In this situation, a typical bonding method would damage the airfoil 46 and not secure it to the disk 44. Therefore, the collar 59, constructed of aluminum or titanium for example, may be secured around the base 54 of the airfoil 46 and then bonded to the disk 44 through any of the above mentioned means. While specific material have been discussed above, this is for description purposes only and any material is possible such as, but not limited to aluminum, titanium, organic matrix composite, aluminum-lithium or other aluminum alloys, titanium alloys, nickel alloys, steel, a combination of alloys, and the like.

As an additional feature, a shear lug 61 may be used to help secure the collar 59 around the airfoil 46 as illustrated in FIG. 6. The shear lug 61 may also be designed to retain opposing surfaces of the collar 59 from deflecting under the radial load imposed by the airfoil 46 as it rotates about axis 32. There may be one or more shear lugs 61 per airfoil 46, depending on a rotational speed of the fan section 22 and a weight of each airfoil 46. Faster rotational speeds and heavier airfoils 46 may use multiple shear lugs 61 to retain the airfoil 46 in the collar 59, for example.

The rotor disk 44 and rotor airfoils 46 of the fan section 22 may consist of the same or separate materials such as, but not limited to, titanium, aluminum, composite plastic, fiber-reinforced plastic, or combinations of these and other materials. Such flexibility in the materials used in the construction of the fan section 22 allows for simple construction where the fan section 22 consists of only one material or also a more complex combination of materials. The material make-up of the fan section 22 may be chosen to meet a desired weight for the fan section 22, a desired mass distribution throughout the fan section 22, and/or a desired physical strength of the fan section 22. For example, the material make-up of the fan section 22 may be chosen such that the base 54 of the airfoil 46 is heavier than that of the tip 58 of the airfoil 46, or vice versa. However, other weight distributions to provide desired effects including aero-elastic tailoring and desired vibratory characteristics are also possible.

Other material options may include combining multiple materials in the construction of each airfoil 46. In one exemplary airfoil 46, a body 64 of the airfoil 46 may be formed of a first metallic material such as aluminum, titanium, and/or another alloy while an edge 66 of the airfoil 46 may be formed of second metallic material such as titanium, nickel, steel, or another alloy. In another exemplary airfoil 46, the body 64 and the edge 66 may be formed of a metallic material as above, and a side panel 67 formed along the body 64 may be formed from an organic matrix composite. Additionally, as illustrated in FIGS. 5 and 6, an insert 68 may be positioned within the body 64 of the airfoil 46. This insert 68 may be constructed of a different material to that of the body 64, which may allow for a reduction in weight. For example, a strong material that can resist creep and bird or debris impacts may be chosen for the body 64 while a light weight material may be chosen for the insert 68. This combination may provide the airfoil 46 with the strength required for operation while reducing the weight compared to an airfoil 46 consisting of only the strengthening material.

Figure 7:
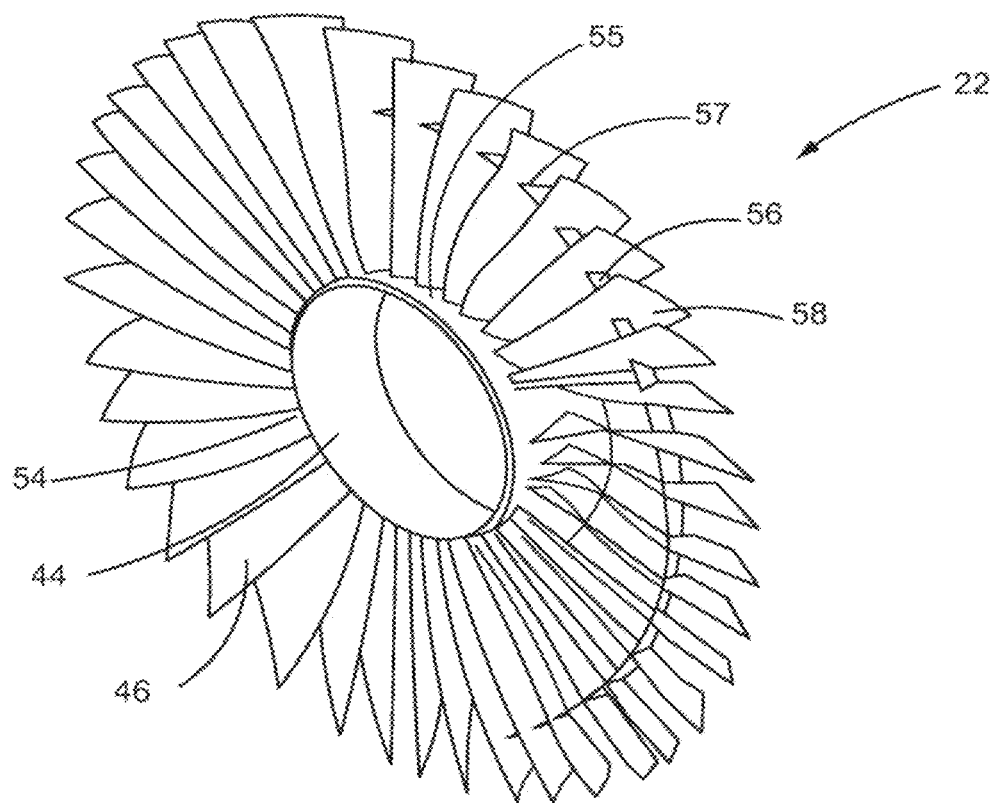
FIG. 7 is a perspective view of a rotor section of a fan constructed in accordance with an embodiment of the present disclosure.

By introducing the unitary fan section 22 design and allowing the inclusion of new materials that may reduce the weight or otherwise alter the structural characteristics of the fan section 22, and thus increase efficiency, the low speed fan design of the present disclosure may enable the fan section 22 to include a partial-span shroud 56 interconnecting the rotor airfoils 46. As shown in the embodiment of FIG. 7, the partial-span shroud 56 may connect a point 57 on each rotor airfoil 46 located between the base 54 and the tip 58 of the rotor airfoil 46 to a similar point 57 on each adjacent rotor airfoil 46. The partial-span shroud 56 may reduce vibratory motion in the rotor airfoil 46 by structurally linking them together thereby providing aeroelastic design options for low speed, low pressure ratio fan airfoils 46. Such a partial span shroud 56 has not been utilized with large prior art fans since their combination of size and rotational speed greatly complicated the inclusion of such additional structures.

Figure 8:
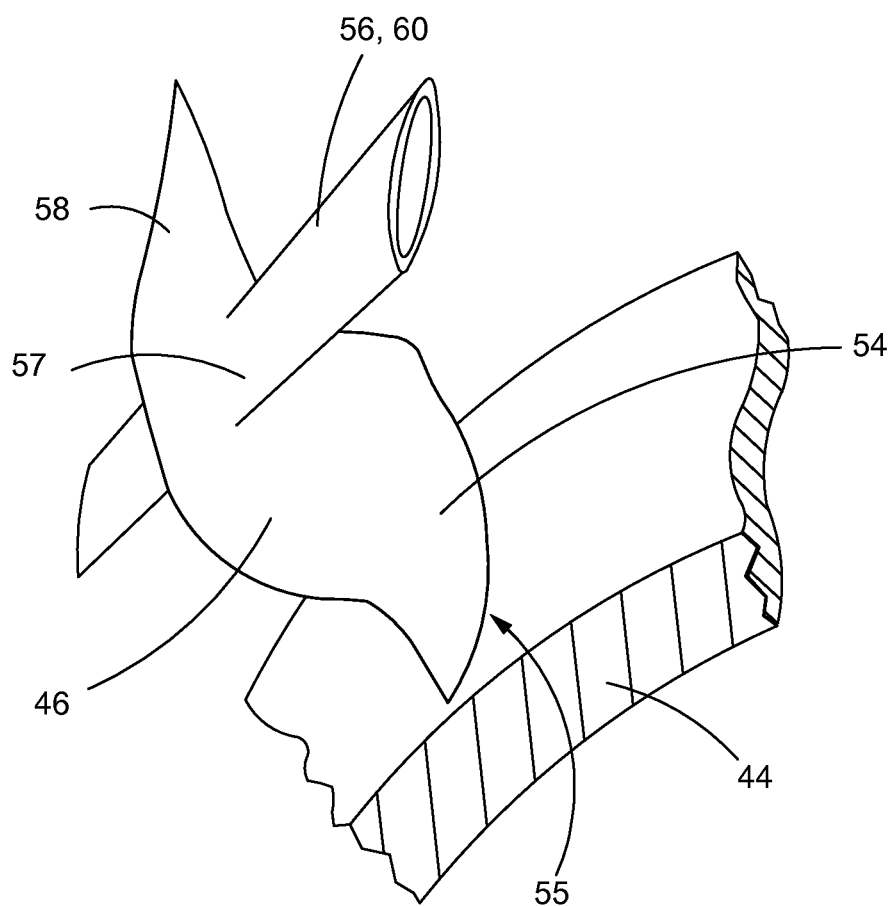
FIG. 8 is a perspective view of a rotor section of a fan constructed in accordance with an embodiment of the present disclosure.

In keeping with the present unitary fan section 22 design, the partial-span shroud 56 may be cast or otherwise formed integral with the rotor airfoils 46. To accomplish this, every rotor airfoil 46 and every partial-span shroud 56 may be cast integrally together. On the other hand, each rotor airfoil 46 may be cast with a segment 60 of the partial-span shroud 56 extending from the rotor airfoil 46 as in FIG. 8. When each rotor airfoil 46 is assembled with the rotor disk 44, the segments 60 of the partial-span shroud 56 may be then joined together in any known method such as welding or laser deposition. They may also be left disconnected. Alternatively, the partial-span shroud 56 may be cast separately and then fixedly attached to the rotor airfoils 46 by any known means, such as welding or laser deposition. The partial-span shroud 56 may also be constructed of the same or separate materials as the rotor airfoils 46 to further reduce weight, manage weight distribution throughout the fan section 22, and/or increase overall strength of the fan section 22. For example, a continuous fiber reinforced composite ring acting as the shroud 56 may be inserted within the rotor assembly.

Figure 9:
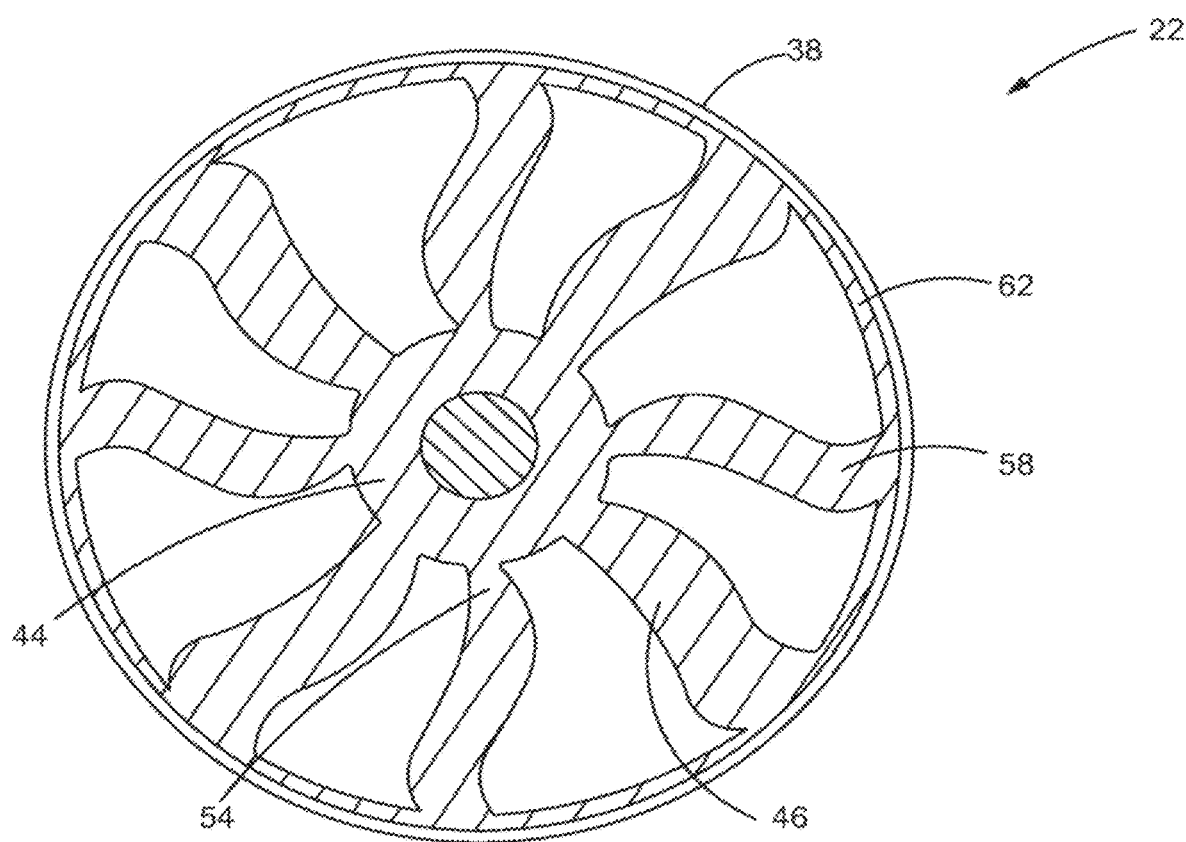
FIG. 9 is a cross-sectional view of a fan constructed in accordance with an embodiment of the present disclosure.

In another embodiment, presented in FIG. 9, the reduction of rotational speed and/or the inclusion of weight reducing material in the fan section 22 may alternatively and/or additionally allow the fan section 22 to include a tip shroud 62 interconnecting the tips 58 of the rotor airfoils 46. This tip shroud 62 may also be unitary with the rotor airfoils 46 in a similar fashion to the partial-span shroud 56. The tip shroud 62 also reduces or otherwise alters the vibratory characteristics of the rotor airfoils 46 for very low rotor speed/pressure ratio design. In addition, the tip shroud 62 may reduce the flow of air which may flow between the tips 58 of the rotor airfoils 46 and the fan case 38 by providing a seal or other discouragers of flow between the case 38 and shroud 62. This reduction of the air bypassing the fan section 22 increases the efficiency of the engine 20 as more air is accelerated by the fan section 22 without increasing the size of the fan section 22. Similar to the partial-span shroud 56, the tip shroud 62 may also be constructed of the same or different materials as the rotor airfoils 46 to reduce weight of the fan section 22, manage weight distribution throughout the fan section 22, and/or provide extra physical strength to the fan section 22.

Figure 10:
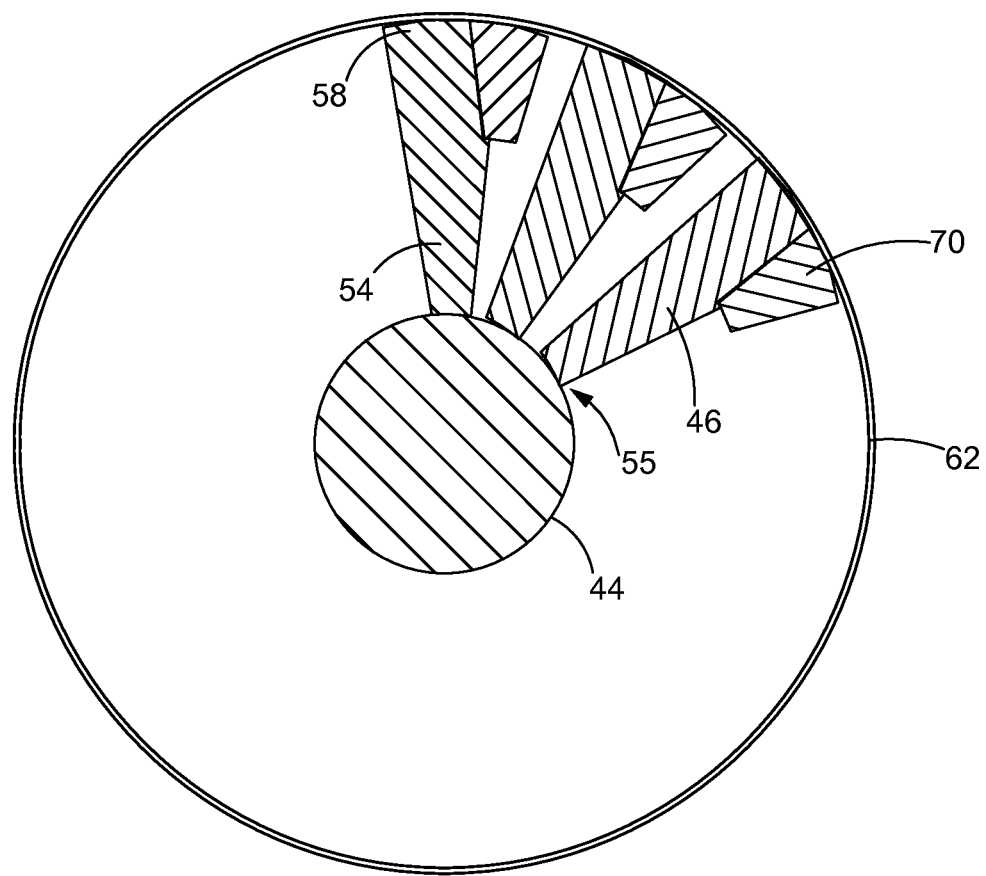
FIG. 10 is a cross-sectional view of a fan constructed in accordance with an embodiment of the present disclosure.

As the size of the fan section 22 is increased and the rotational speed of the fan section 22 is reduced the tips 58 of the airfoils 46 may be the only areas of the fan section 22 rotating at a high tangential velocity. For this reason, increasing the surface area of the airfoils 46 in this region may increase the pressure ratio of air that is created by the fan section 22. To this end, an outer-span blade 70 may be attached as a continuous aerodynamic extension to the airfoil 46 and tip shroud 62 proximate to the tip 58 of the airfoils 46 as illustrated in FIG. 10. Alternatively, the airfoils 70 may be a standalone partial span airfoil attached to the outer shroud 62 and located between adjacent airfoils 46. This increases the surface area of the airfoils 46 and may allow for better fan section 22 performance at slower rotational speeds. These blades 70 may be integrally formed with the airfoils 46, the tip shroud 62, both, or formed separately and attached by any of the means presented above such as, but not limited to, welding, transient liquid phase bonding, or direct laser or other additive manufacturing enabled deposition. The blades 70 may consist of the same or different materials as the rest of the fan section 22, including the hub 44, airfoils 46, and tip shroud 62, such as, but not limited to, aluminum, titanium, steel, or organic matrix composite.

INDUSTRIAL APPLICABILITY

From the foregoing, it can be seen that the technology disclosed herein has industrial applicability in a variety of settings such as, but not limited to providing new material and structural options for low speed large diameter fan sections of gas turbine engines. By reducing the rotational speed of the fan section the effect of bird and debris impacts is reduced allowing for increased fan diameter, new materials, and new structural features. One such feature may be forming a unitary one-piece fan, disk and airfoils, by attaching the rotor airfoils directly to the rotor disk by welding or similar methods, or casting or otherwise forming the rotor airfoils and disk as one piece to reduce the overall weight of the fan section from prior art fan sections. Another feature may be constructing the fan section from light-weight materials such as, but not limited to, titanium, aluminum, composite plastic, fiber reinforced plastic, or a combination of materials to further reduce the weight of the fan section. The slower rotational speeds coupled with this reduction of weight in the fan section allows for a higher weight capacity for an aircraft using the engine as a source of propulsion, as well as allowing further features to be incorporated into the fan section such as a partial-span shroud, a tip shroud, and an outer-span blade.

While the present disclosure has been made in reference to a fan section of a geared turbofan engine for use with an aircraft, one skilled in the art will understand that the teachings herein can be used in other applications as well, such as for any slow rotating large diameter rotor. It is therefore intended that the scope of the invention not be limited by the embodiments presented herein to set forth the best mode currently known for carrying out the invention, but rather that the invention includes all equivalents falling within the spirit and scope of the appended claims.

What is claimed is:

1. A fan section for a gas turbine engine, comprising:
a rotor disk made of metal; and
a plurality of airfoils fixedly attached to and supported by the rotor disk as a single unitary piece and extending radially outward from the rotor disk with respect to an axis of the gas turbine engine, each airfoil of the plurality of airfoils having a collar bonded to a radially outermost surface of the rotor disk, the collar having an outer surface that is flush with an exterior surface of the airfoil, wherein the collar fixedly secures a respective one of the plurality of airfoils to the rotor disk, and each of the plurality of airfoils being made at least partially of an organic matrix composite, and wherein the collar is positioned around a respective base of the respective one of the plurality of airfoils and extends radially above the radially outermost surface of the rotor disk.

2. The fan section of claim 1, wherein the collar is made of aluminum or titanium.

3. The fan section of claim 1, further comprising a shear lug extending through the collar and the respective one of the plurality of airfoils.

4. The fan section of claim 1, wherein each airfoil of the plurality of airfoils includes a body and an edge extending radially along the body, the body being formed from the organic matrix composite and the edge being formed of a metallic material.

5. The fan section of claim 1, wherein each airfoil of the plurality of airfoils includes a body and an edge extending radially along the body, the body being formed from a first metallic material and the edge being formed from a second metallic material.

6. The fan section of claim 1, wherein each airfoil of the plurality of airfoils further include a side panel formed along a body of the airfoil, the side panel being formed from an organic matrix composite.

7. The fan section of claim 1, further comprising a partial-span shroud connecting adjacent airfoils of the plurality of airfoils, the partial-span shroud extending from a point on each airfoil of the plurality of airfoils located between a base and a tip of each airfoil of the plurality of airfoils to a similar point on an adjacent airfoil of the plurality of airfoils.

8. The fan section of claim 7, wherein the partial-span shroud is cast, fixedly attached, or fabricated as one unitary piece with the adjacent airfoils of the plurality of airfoils.

9. The fan section of claim 1, further comprising a tip shroud connecting adjacent airfoils of the plurality of airfoils at a tip of each airfoil of the plurality of airfoils.

10. The fan section of claim 9, wherein the tip shroud is one of cast, fixedly attached, and fabricated as one unitary piece with the adjacent airfoils of the plurality of airfoils.

11. The fan section of claim 9, further comprising an outer-span blade attached to the tip of at least one of the plurality of airfoils and the tip shroud, wherein the outer-span blade is one of cast, fixedly attached, and fabricated as one unitary piece with the at least one of the plurality of airfoils.

12. The fan section of claim 1, wherein each airfoil of the plurality of airfoils has a tip, and the tip of each airfoil of the plurality of airfoils rotates at a maximum speed of 1050 feet per second or less.

13. A gas turbine engine, comprising:
- a fan section having a rotor disk made of metal, and a plurality of airfoils, the plurality of airfoils being fixedly attached to and supported by the rotor disk as a single unitary piece and extending radially outward from the rotor disk with respect to an axis of the gas turbine engine, each airfoil of the plurality of airfoils having a collar bonded to a radially outermost surface of the rotor disk, the collar having an outer surface that is flush with an exterior surface of a respective one of the plurality of airfoils, wherein the collar fixedly secures the respective one of the plurality of airfoils to the rotor disk, each of the plurality of airfoils being made at least partially of an organic matrix composite, and wherein the collar is positioned around a base of the respective one of the plurality of airfoils and extends radially above the radially outermost surface of the rotor disk;
- a compressor section downstream from the fan section;
- a combustor downstream from the compressor section; and
- a turbine section downstream from the combustor and in mechanical communication with the fan section and compressor section via an engine shaft.

14. The gas turbine engine of claim 13, wherein each airfoil of the plurality of airfoils includes a body, an edge and a side panel, the body, the edge and the side panel being made of one of organic matrix composite and metal.

15. A method of forming a fan section of a gas turbine engine, the method comprising:
- providing a rotor disk made of metal; and
- fixedly attaching a plurality of airfoils to the rotor disk with a plurality of collars, each airfoil of the plurality of airfoils being made at least partially of organic composite matrix and each collar of the plurality of collars being bonded to a radially outermost surface of the rotor disk and each collar of the plurality of collars having an outer surface that is flush with an exterior surface of a respective one of the plurality of airfoils, wherein each collar of the plurality of collars is positioned around a respective base of the respective one of the plurality of airfoils and extends radially above the radially outermost surface of the rotor disk.

16. The method of claim 15, further comprising fixedly attaching a partial-span shroud to adjacent airfoils of the plurality of airfoils.

17. The method of claim 15, further comprising fixedly attaching a tip shroud between adjacent airfoils of the plurality of airfoils.

18. The method of claim 17, further comprising fixedly attaching an outer-span blade to at least one airfoil of the plurality of collars and the tip shroud as a tip-biased aerodynamic extension of the at least one airfoil of the plurality of airfoils.

* * * * *